UNITED STATES PATENT OFFICE.

WILLIAM G. LINDSAY, OF CALDWELL, NEW JERSEY, ASSIGNOR TO THE CELLULOID COMPANY, OF NEW YORK, N. Y., A CORPORATION OF NEW JERSEY.

PROCESS FOR MAKING ACETYL-CELLULOSE PLASTIC COMPOUNDS.

1,041,118.   Specification of Letters Patent.   Patented Oct. 15, 1912.

No Drawing.   Application filed November 27, 1911.   Serial No. 662,748.

*To all whom it may concern:*

Be it known that I, WILLIAM G. LINDSAY, a citizen of the United States, residing in Caldwell, county of Essex, State of New Jersey, have invented certain new and useful Improvements in Processes for Making Acetyl - Cellulose Plastic Compounds, of which the following is a specification.

The various compositions to which the present invention relates are employed in the arts, generally as imitations of natural substances, sometimes in their original finished form with or without incorporated colors and other inert substances, and sometimes as films which are used for photographic and other purposes.

Although the final or useful form of the different compounds of acetyl cellulose is that of a solid material, the different processes of conversion into this final solid form involve, as is well understood, the employment of solutions or mixtures of varying consistency as to plasticity, stiffness, or fluidity, depending generally upon the proportion and kind of solvent used to the amount of the original base-acetyl cellulose.

It has been known for many years that camphor and ethyl alcohol in admixture form a solvent for nitrocellulose in the cold or at room temperature, and also that the camphor can be mixed with the nitrocellulose and that the subsequent addition of ethyl alcohol causes solution or conversion of the nitrocellulose. I have found, however, that when that process is applied to acetyl cellulose no solvent action takes place. It is also well known that camphor is a combustible substance and that when mixed even with acetyl cellulose and a liquid solvent the resulting compound is more or less combustible, and it was the object of my experiments to find substances which in a suitable combination would effect solution or conversion of the acetyl cellulose into a plastic mass which, upon the application of heat and pressure can be molded or otherwise worked in a manner analogous to the nitrocellulose - camphor compounds, but which would be substantially non-inflammable or incombustible.

In the course of my experiments I have found that acetyl cellulose plastic compounds of the kind desired can be produced by the use of triphenylphosphate or tricresylphosphate, or a mixture of the two, in conjunction with tetrachlorethyl acetanilid or trichlormethyl acetanilid, or a mixture of the two, dissolved in ethyl alcohol. I prefer the use of triphenylphosphate because in conjunction with the alcohol it seems to exert a more powerful solvent action upon the acetyl cellulose than does tricresylphosphate, but the application of heat is necessary to bring about a solution or conversion of the acetyl cellulose by the use of the substances which I have named.

In this specification and the claims appended hereto, I refer only to that variety of acetyl cellulose which is soluble in acetone in the cold.

As an example of carrying out my invention I take 100 parts of acetyl cellulose (acetone soluble variety) and thoroughly incorporate it by mixing, grinding, or otherwise, with from 10 to 30 parts of either triphenylphosphate or tricresylphosphate (or a mixture of the two) and with from 25 to 35 parts of either tetrachlorethyl acetanilid or trichlormethyl acetanilid, or a mixture of the two. I then add by sprinkling or otherwise 50 to 70 parts of ethyl alcohol. I then allow the mass to stand from 12 to 24 hours or longer in a covered vessel in order to secure good penetration. The mixture is then placed in a steam jacketed mixing machine or a boiling hot water bath of 100° C., and after thorough mixing under the influence of heat the resultant mass is pressed in suitable heated forms into blocks or cakes which can be cut into sheets or other shapes and dried or seasoned in a manner analogous to that practiced in the nitrocellulose plastic art. Or, if desired, the heated mass can be placed in suitable heated molds of the final shape desired. In both of the cases last mentioned the mass should be kept under the influence of heat until the shape desired is given and then should be cooled artificially while still under pressure.

It will of course be understood by those skilled in the art that the order of mixing the various ingredients of the compound can be changed if desired, and that coloring matters and other inert substances can be incorporated in the compound, if desired. It will also be understood by the operator that slight variations in the proportions of the ingredients named may occur intentionally or designedly, without departing from the spirit of my invention.

Having thus described my invention, what I claim is:—

1. The process of dissolving or converting acetyl cellulose which consists in dissolving or converting an acetyl cellulose that is soluble in acetone by the use of one or more of the group of hereinbefore-specified acetanilids (tetrachlorethyl acetanilid, trichlormethyl acetanilid) in conjunction with one or more of the group of hereinbefore-specified phosphates (triphenylphosphate, tricresylphosphate) and ethyl alcohol with the application of heat, substantially as set forth.

2. The process of dissolving or converting acetyl cellulose which consists in dissolving or converting an acetyl cellulose that is soluble in acetone by the use of one or more of the group of hereinbefore-specified acetanilids (tetrachlorethyl acetanilid, trichlormethyl acetanilid) in conjunction with one or more of the group of hereinbefore-specified phosphates (triphenylphosphate, tricresylphosphate) coloring matters or other inert substances and ethyl alcohol, with the application of heat, substantially as set forth.

WILLIAM G. LINDSAY.

Witnesses:
J. E. HINDON HYDE,
MABEL DENTON.